(12) United States Patent
Michel et al.

(10) Patent No.: US 6,885,457 B1
(45) Date of Patent: Apr. 26, 2005

(54) ROTARY POSITION MEASURING SYSTEM

(75) Inventors: Dieter Michel, Traunstein (DE); Wolfgang Holzapfel, Obing (DE)

(73) Assignee: Dr. Johannes Heidenhein GmbH, Traunrout (DE)

( * ) Notice: Subject to any disclaimer, the term of this patent is extended or adjusted under 35 U.S.C. 154(b) by 0 days.

(21) Appl. No.: 09/365,118

(22) Filed: Jul. 30, 1999

(30) Foreign Application Priority Data

Aug. 1, 1998 (DE) .......................................... 198 34 860
May 21, 1999 (DE) .......................................... 199 23 505

(51) Int. Cl.[7] .............................................. G01B 9/02
(52) U.S. Cl. ...................................................... 356/499
(58) Field of Search ................................ 356/499, 521, 356/498; 250/231.14, 231.15, 231.16, 231.18, 237 G

(56) References Cited

U.S. PATENT DOCUMENTS

| | | | |
|---|---|---|---|
| 4,156,137 A | | 5/1979 | Nelle |
| 4,171,160 A | | 10/1979 | Ernst |
| 4,176,276 A | * | 11/1979 | Kaul et al. .............. 250/237 G |
| 4,243,325 A | | 1/1981 | Ernst |

(Continued)

FOREIGN PATENT DOCUMENTS

| | | |
|---|---|---|
| DE | 37 02 203 | 7/1987 |
| DE | 36 09 211 | 9/1987 |
| DE | 39 00 464 | 7/1990 |
| EP | 0 163 362 | 12/1985 |
| EP | 0 564 683 | 10/1993 |
| EP | 0 577 104 | 1/1994 |
| EP | 0 735 346 A2 | 10/1996 |
| WO | WO 93/06508 | 4/1993 |

OTHER PUBLICATIONS

"Langen in der Ultraprazisionstechnik messen Length measuring in Ultra–Precision Technology," by A. Spiess, Feinwerktechnik & Messtechnik 98 [Precision Mechanics & Measuring Technology 98], vol. 10, pp. 406–410 (1990).
English language Abstract of West German reference 36 09 211.
English language Abstract of German reference 37 02 203.
English language Abstract of German reference 39 00 464.

*Primary Examiner*—Samuel A. Turner
*Assistant Examiner*—Michael A. Lyons
(74) *Attorney, Agent, or Firm*—Brinks Hofer Gilson & Lione

(57) ABSTRACT

A rotary position measuring system having a housing connected with a scanning unit having a light source that emits beams of light and a detector element. A reflection scanning graduation structure arranged directly on the housing opposite the scanning unit. A graduated disk is connected with a rotatable shaft and has a radial transmission measuring graduation structure, wherein the graduated disk is arranged so it is rotatable around an axis of symmetry in the housing so that the measuring graduation structure is located between the scanning unit and the scanning graduation structure. The beams of light emitted by the light source first reach the measuring graduation structure where they are split into a first set of diffracted partial beams of different orders and the diffracted partial beams impinge on the scanning graduation structure. A second set of diffracted partial beams of different orders results and a back-reflection of the second set of diffracted partial beams in the direction toward the measuring graduation structure results, where the second set of diffracted partial beams interfere with one another and the detection of interfering partial beams takes place by the detector element.

25 Claims, 5 Drawing Sheets

U.S. PATENT DOCUMENTS

| | | | |
|---|---|---|---|
| 4,423,958 A | | 1/1984 | Schmitt |
| 4,495,700 A | | 1/1985 | Ernst |
| 4,530,155 A | | 7/1985 | Burkhardt et al. |
| 4,530,159 A | | 7/1985 | Ernst |
| 4,616,131 A | | 10/1986 | Burkhardt |
| 4,641,027 A | * | 2/1987 | Renner et al. ......... 250/231.14 |
| 4,700,062 A | | 10/1987 | Ernst |
| 4,776,701 A | | 10/1988 | Pettigrew |
| 4,815,850 A | | 3/1989 | Kanayama et al. |
| 5,021,735 A | | 6/1991 | Maass et al. |
| 5,079,418 A | | 1/1992 | Michel et al. |
| 5,336,884 A | | 8/1994 | Khoshnevisan et al. |
| 5,428,445 A | * | 6/1995 | Holzapfel ................... 356/499 |
| 5,451,776 A | | 9/1995 | Kolloff et al. |
| 5,493,399 A | | 2/1996 | Meyer et al. |
| 5,661,296 A | * | 8/1997 | Ishizuka et al. ....... 250/231.16 |
| 5,663,794 A | * | 9/1997 | Ishizuka ..................... 356/499 |
| 5,666,196 A | * | 9/1997 | Ishii et al. .................. 356/499 |
| 5,689,336 A | * | 11/1997 | Huber ........................ 356/499 |
| 5,716,679 A | | 2/1998 | Krug et al. |
| 5,774,219 A | * | 6/1998 | Matsuura ................ 250/237 G |
| 5,977,539 A | * | 11/1999 | Holzapfel et al. .......... 356/499 |
| 6,005,667 A | * | 12/1999 | Takamiya et al. ........... 356/499 |
| 6,154,278 A | * | 11/2000 | Ito et al. ..................... 356/499 |

* cited by examiner

ROTARY POSITION MEASURING SYSTEM

Applicants claim, under 35 U.S.C. § 119, the benefit of priority of the filing date of Aug. 1, 1998 of a German patent application, Serial Number 198 34 860.1, filed on the aforementioned date, the entire contents of which is incorporated herein by reference. Applicants also claim, under 35 U.S.C. § 119, the benefit of priority of the filing date of May 21, 1999 of a German patent application, Serial Number 199 23 505.8, filed on the aforementioned date, the entire contents of which is incorporated herein by reference.

BACKGROUND OF THE INVENTION

1. Field of the Invention

The invention relates to a rotary position measuring system in accordance with the interferential operating principle.

2. Discussion of Related Art

A so-called interferential three-grating transducer is known, for example, from EP 0 163 362 B1, or from the publication "Längen in der Ultrapräzisionstechnik messen" [Length Measuring in Ultra-Precision Technology] of A. Spiess in "Feinwerktechnik & Messtechnik 98" [Precision Mechanics & Measuring Technology], (1990), 10, pp. 406 to 410. It is possible by means of such a three-grating transducer to generate incremental signals, which are modulated as a function of displacement, by means of which the relative positions of two objects, which can be moved with respect to each other, can be determined. Here, one of the objects, which can be moved with respect to each other, is connected with a scanning unit, which, inter alia, comprises a scanning graduation structure. The other object, however, is connected with a measuring graduation structure, which is scanned by the scanning unit for the generation of the position-dependent signals. While a transparent phase grating is used as the scanning graduation structure, a reflection phase grating is provided as the measuring graduation structure.

Such interferential three-grating transducers, which are operated in incident light, usually have their so-called neutral pivot on the plane of the scanning graduating structure. In this connection, neutral pivot is understood to mean the point around which either the measuring graduation structure or the optical scanning device inclusive of the scanning graduation structure can be pivoted within a defined tolerance range without the output position signal changing its position. However, it is basically desired to move the neutral pivot into an area in which possibly occurring oscillations or tilts of the respective structure during the measuring operation have the least possible effect on the resultant measurement accuracy. In the case of a rotary position measuring system based on such an interferential operating principle in particular, it would be desirable for the neutral pivot to lie on the plane of the rotating graduation structure, or respectively graduated disk, since the graduated disk basically is subject to tilting, tumbling movements, etc. because of bearing tolerances.

SUMMARY OF THE INVENTION

It is therefore an object of the present invention to recite a rotary position measuring system in accordance with the interferential operating system which during measuring operations is as insensitive as possible to oscillations of the housing and/or tilting of a rotating graduated disk.

This object is attained by a rotary position measuring system having a housing connected with a scanning unit having a light source that emits beams of light and a detector element. A reflection scanning graduation structure arranged directly on the housing opposite the scanning unit. A graduated disk is connected with a rotatable shaft and has a radial transmission measuring graduation structure, wherein the graduated disk is arranged so it is rotatable around an axis of symmetry in the housing so that the measuring graduation structure is located between the scanning unit and the scanning graduation structure. The beams of light emitted by the light source first reach the measuring graduation structure where they are split into a first set of diffracted partial beams of different orders and the diffracted partial beams impinge on the scanning graduation structure. A second set of diffracted partial beams of different orders results and a back-reflection of the second set of diffracted partial beams in the direction toward the measuring graduation structure results, where the second set of diffracted partial beams interfere with one another and the detection of interfering partial beams takes place by the detector element.

Initially, the present invention is based on the realization that for meeting the recited requirements the mentioned neutral pivot must be located in the plane of the rotating graduation structure, i.e. in the plane of the graduated disk. Only in this way can the respective position measuring system become insensitive to tumbling movements of the graduated disk, which are possibly caused by oscillations of the housing or bearing tolerances. The above mentioned design of the interferential three-grating transducer with a reflection phase structure as the measuring graduation structure therefore must be changed in accordance with the invention in such a way, that the rotating graduated disk is provided with a transparent measuring graduation structure, while the required reflecting scanning graduation structure is arranged to be stationary.

In accordance with the invention it has therefore been provided on the one hand to embody the measuring graduation structure as a transparent phase grating and to arrange it on the rotating graduated disk in a circular ring shape. Furthermore, the scanning graduation structure, which is designed as a reflection phase grating, is arranged stationary and level directly on the oscillation-insensitive housing of the rotary position measuring system. A scanning unit is also arranged stationary on the housing opposite the scanning graduation structure and, inter alia, comprises a light source as well as one or several detector elements, by means of which signals, which have been modulated as a function of position, are detected.

An oscillation-insensitive arrangement of the scanning graduation structure can be assured in the most simple manner by means of the arrangement, selected in accordance with the invention, of this portion of the position measuring system directly on the respective housing. In this connection there are a number of options as to how the arrangement of the scanning graduation structure can take place at this position.

However, the position, or respectively the arrangement of the scanning unit with the light source and the detector elements is less critical with respect to the susceptibility to possible oscillations and vibrations. In accordance with the invention, this component is arranged on the side of the graduated disk, or respectively the measuring graduation structure facing away from the housing.

Therefore the result is a highly accurate rotary position measuring system based on an interferential operating principle which, on the one hand, is simply and compactly built and, on the other hand, is insensitive to unavoidable mechanical effects.

Further advantages as well as details of the rotary position measuring system in accordance with the invention ensue from the following description of an exemplary embodiment by means of the attached drawings.

BRIEF DESCRIPTION OF THE DRAWINGS

FIG. 3b is a sectional representation of the measuring graduation structure in FIG. 3a;

FIG. 4b is a sectional representation of the scanning graduation structure in FIG. 4a;

DESCRIPTION OF THE PREFERRED EMBODIMENT

Figure 1:
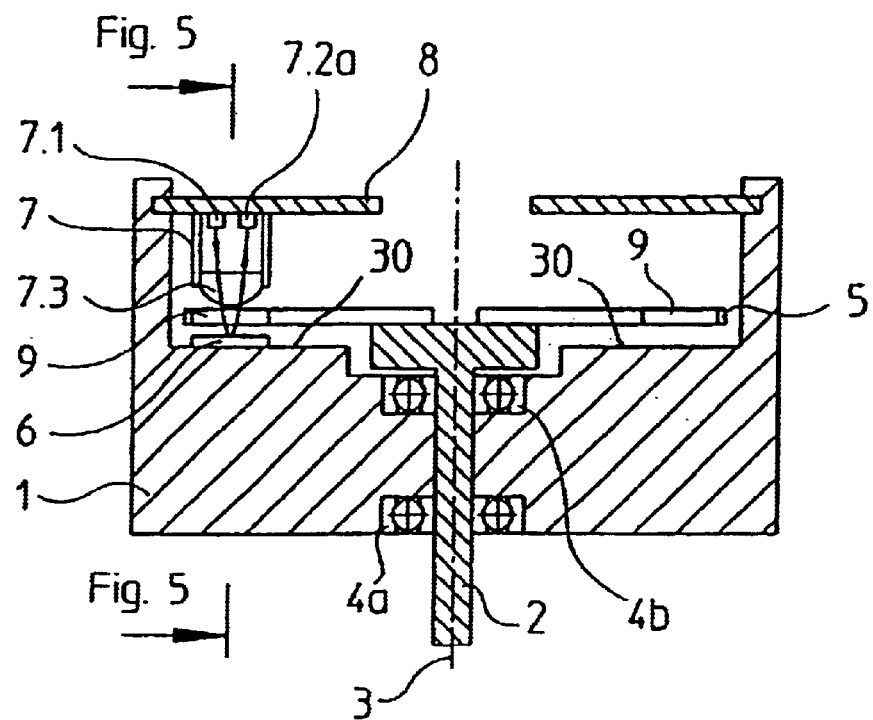
FIG. 1 is a schematic cross-sectional representation of an exemplary embodiment of a rotary position measuring system in accordance with the invention.

A possible embodiment of the rotary position measuring system in accordance with the invention will be described below by means of the schematic cross-sectional representation in FIG. 1. The flange of the housing 1 of the position measuring system, in which a shaft 2 is seated, rotatable around its longitudinal axis 3, can be basically recognized. In this case, the housing 1 is embodied to be cylindrical. In the exemplary embodiment represented, the shaft 2 is rotatably arranged in the housing 1 as free of friction as possible by means of two bearings 4a, 4b. In this connection it should be noted that the bearing of the shaft 2 in the housing 1 is in no way essential to the invention. The shaft 2 is in turn connected, for example via a suitable coupling, with a drive, a spindle, etc., whose rotary movement is to be respectively detected by means of the position measuring system in accordance with the invention. The latter elements are not represented for reasons of clarity. A circular graduated disk 5 is rigidly fastened symmetrically in relation to the longitudinal, or respectively rotational axis 3 at the end of the shaft 2 facing the position measuring system, which can take place, for example, by means of a screw connection, not represented. The graduated disk 5 has at least one track with a radially arranged measuring graduation structure 9, which is only schematically indicated in the plan view in FIG. 1, and which will be discussed in greater detail in what follows. The optical scanning of this track, or respectively of the measuring graduation structure 9, provides the desired position-dependent incremental signals, which can be further processed in a known manner by a downstream connected numerical control, for example.

In accordance with the invention, a scanning graduation structure 6 has been arranged level with and directly on the housing 1 of the position measuring system, which has also only been indicated schematically in FIG. 1, the same as the actual scanning beam path. Details of this will be explained in greater detail below. A scanning unit 7 is arranged rigidly on the housing 1 opposite the scanning graduation structure 6 by means of a circular plate 8. The scanning unit 7 comprises, inter alia, a light source 7.1, preferably several detector elements 7.2a, only one of which is indicated in FIG. 1, as well as an optical device 7.3, which functions as a collimator, or respectively a condenser.

Here, the scanning unit 7 is connected via the lateral housing walls with the actual housing 1. This results in a clearly oscillation-free arrangement of this element of the position measuring system of the invention, since as a rule the housing walls are not made so massively that it would be possible to assuredly prevent oscillations of the plate 8.

On the one hand, the most rigid connection possible of the scanning unit 7 with the housing 1 is provided via the plate 8. On the other hand, the elements arranged in the scanning unit 7 are contacted via the plate 8 and the electrical bar conductors. FIG. 1 only shows the structure of the scanning unit 7 in a greatly schematized form. An enlarged view thereof is shown for instance in FIG. 5, a section through the detector plane of the scanning unit 7 will be described in greater detail below by means of FIG. 6.

Accordingly, the graduated disk 5 with the measuring graduation structure 9 rotating around the axis 3 from which, when it is optically scanned, the desired signals, which are modulated as a function of position and which are detected by the detector elements 7.1, are generated in the end, is arranged between the scanning unit 7 and the scanning graduation structure 6.

Figure 2:
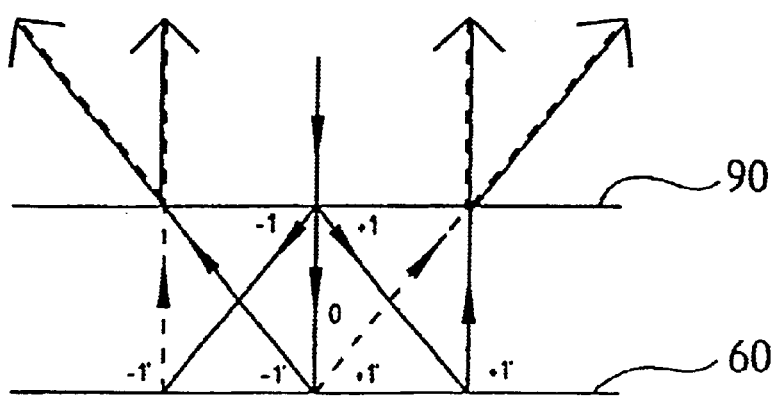
FIG. 2 schematically shows the principal beam path within the position measuring system in accordance with the invention.

The basic scanning beam path in the rotary position measuring system in accordance with the invention is schematically represented in FIG. 2. Here, the beams emitted by a light source LQ first reach a measuring graduation structure 90, which is designed as a transmission phase structure. Splitting of the impinging beams into partial beams of the zeroth, as well as +/−1st orders of diffraction, takes place there. Thereafter, the partial beams 0, +1 and −1 impinge on the stationary scanning graduation structure 60. The scanning graduation structure 60 is designed as a reflection phase structure that causes a back reflection of the impinging partial beams 0, +1 and −1 into the +/−1 st orders of diffraction and therefore back in the direction of the movable measuring graduation structure 90. There, different partial beams +1, −1' are caused to interfere, wherein the resultant interference beams are dispersed by the diffracting effect of the measuring graduation structure 90 into the various spatial directions, in which the detector elements DET0, DET+1 and DET−1 are arranged, i.e. into the resulting zeroth, as well as +/−1st orders of diffraction. In the case of a rotating relative movement between the measuring graduation structure 90 and the scanning graduation structure 60, based on the different phase shifts of the partial beams +1', −1' taking part in the interference, intensity-modulated incremental signals result in the end on the part of the detector elements DET0, DET+1 and DET−1, which are respectively phase-shifted by 120° with respect to each other and can be used in a known manner for a highly accurate position determination.

In contrast to the known design of an interferential three-grating transducer with a reflection phase structure as the measuring graduation structure, it is now provided by the invention to design the measuring graduation structure 90 as a transmission phase structure. Moreover, in accordance with the invention, the scanning graduation structure 60 is designed as a reflecting phase structure, while conventional interferential three-grating transducers in accordance with EP 0 163 362 B2 always provide a scanning graduation structure in the form of a transmission phase structure. Based on these steps it is achieved at the end that the neutral pivot of the position measuring system in accordance with the invention lies in the plane of the movable, or respectively rotating measuring graduating structure 90, i.e. in the plane of the graduated disk. Possible tilting or tumbling of the corresponding graduated disk with the measuring graduation structure 90 now no longer affects the position of the position-dependent signals.

It has furthermore been shown to be advantageous if, as explained by means of FIG. 1, the scanning graduation structure 6 is arranged level or flat as directly as possible on the housing of the position measuring device, so that an arrangement of the scanning graduation structure 6 results that is particularly insensitive to oscillations. Possible undefined position changes on the part of the scanning graduation structure 6, perhaps caused by vibrations, etc., would result in the position measurement being distorted thereby, and the accuracy of the position determination would in the end be negatively affected.

Figure 3A:
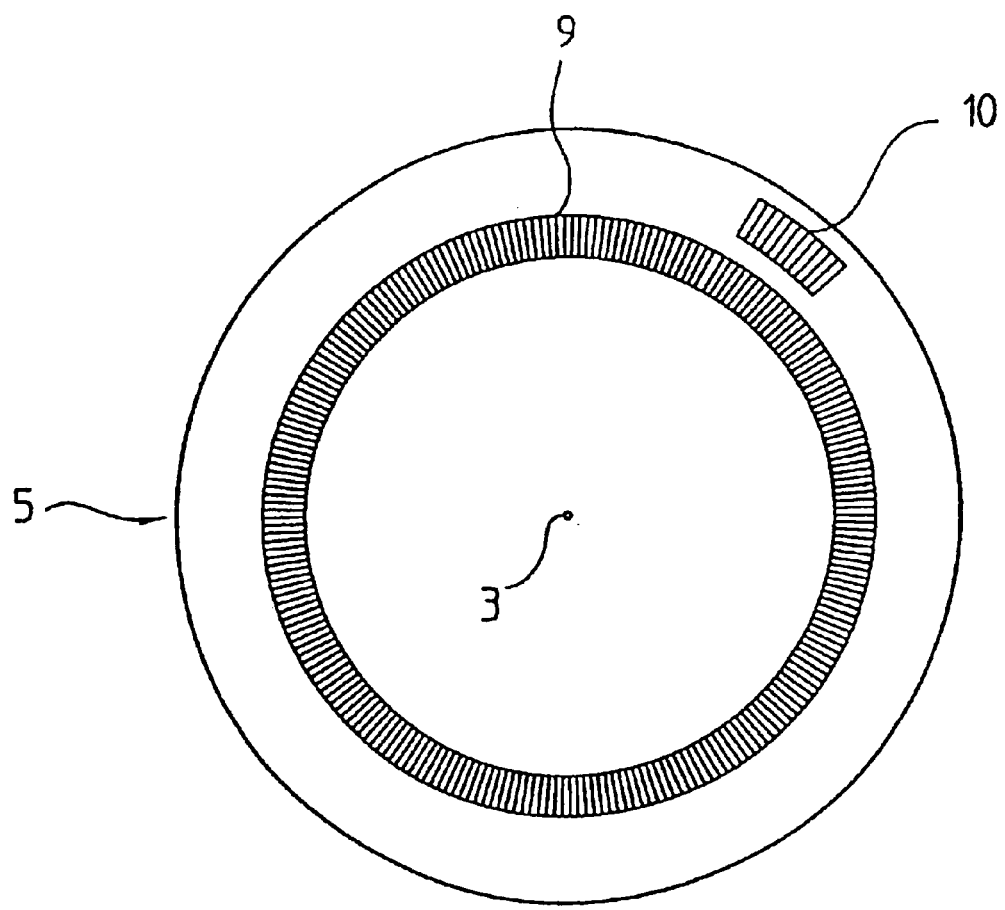
FIG. 3a is a view from above on the graduated disk from the exemplary embodiment in FIG. 1 with the radially arranged measuring graduation structure.

A top view of the graduated disk 5 used in the exemplary embodiment of FIG. 1 is represented in FIG. 3a. Here, the radially symmetrical arrangement of the track with the measuring graduation structure 9 around the axis of rotation 3 can be seen wherein, as mentioned, the measuring graduation structure 9 is designed as a transparent phase structure. Regarding details of this phase structure, reference is made to FIG. 3b described in what follows, that represents a sectional view of the measuring graduation structure 9. Besides the track with the measuring graduation structure 9, a reference marker field 10 that is arranged adjoining the track with the measuring graduation structure 9 on the graduated disk 5, can be seen in the represented exemplary embodiment A reference pulse signal can be generated in a known manner at a defined position by means of the optical scanning of the reference marker field 10, i.e. an absolute relationship can be created in the course of the rotary position measurement.

Besides the represented variation with only a single reference marker field 10, or, respectively, a single track with a measuring graduation structure, it is of course possible by means of the invention to realize the most diverse variations of this configuration. For example, if desired, several reference marker fields at even distances from each other can be provided, or also distance-coded reference marker fields, for example, can be provided. It would also be possible to arrange several measuring graduation structures with different graduation periods next to each other on the graduated disk, etc.

Figure 3B:
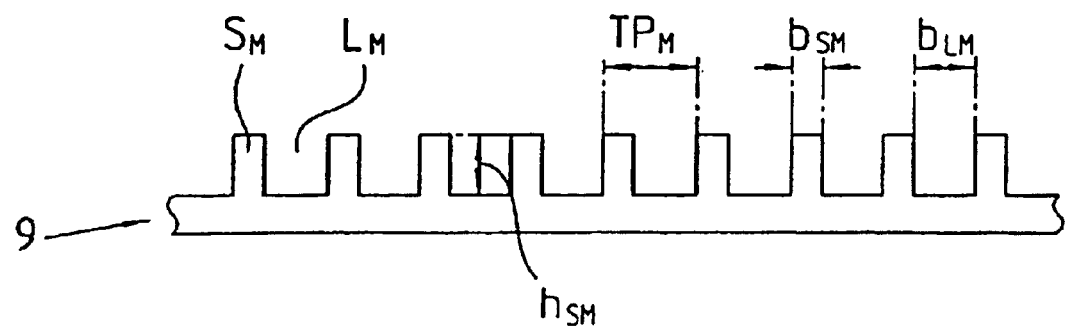

The measuring graduation structure 9 that is designed as a transparent phase structure, will be explained in greater detail in what follows by means of the sectional view in FIG. 3b.

The measuring graduation structure 9 has a sequence of periodically, or respectively alternatingly arranged bars $S_M$ and gaps LM.

A number of options exist regarding the production of the measuring graduation structure. In a preferred embodiment it is provided to produce the measuring graduation structure 9 by dry etching of quartz. In this case either a quartz substrate is directly used as the support substrate, or a thin quartz layer is applied to a transparent glass or plastic support substrate. In this case, the respective support substrate is then also used as an etching stop for the dry etching process.

Alternatively to this, a cost-effective production of the measuring graduation structure 9 would also be possible by a stamping method similar to the production process for CDs (compact discs).

The graduation period $TP_M$ of the measuring graduation structure 9 here corresponds to the sum of the widths $b_{SM}$, $b_{LM}$ of a bar $S_M$ and a gap $L_M$, i.e. $T_{PM}=b_{SM}+b_{LM}$. In the exemplary embodiment represented, the bar width $b_{SM}=\frac{1}{3} TP_M$ was selected, $b_{LM}=\frac{2}{3} TP_M$ then applies for the gap width $b_{LM}$.

Alternatively to this it would also be possible to select the bar width $b_{SM}=\frac{2}{3} TP_M$, $b_{LM}=\frac{1}{3} TP_M$ would then apply for the gap width $b_{LM}$.

The bar height $h_{SM}$ or phase depth for the represented exemplary embodiment of a step phase grating is preferably selected in accordance with the following equation:

$$h_{SM}(n-1) \approx \lambda/3$$

wherein n indicates the refractive index of the bar material and λ the wavelength of the light source used. Accordingly, the phase depth is selected to differ from 180', preferably as 120°. For this purpose a bar height $h_{SM}$ of approximately λ/6 should be provided.

In a preferred embodiment of the rotary position measuring system in accordance with the invention, the measuring graduation structure 9 is arranged in a circular manner on the graduated disk and has a diameter of 40 mm. 32768 graduation periods of the measuring graduation structure have been applied over the complete circle circumference, so that 65536 signal periods of the output signal per revolution result. In this case $TP_M=3.83$ μm applies for the graduation period $TP_M$, while $b_{SM}=1.28$ μm, $b_{LM}=2.55$ μm is selected, or $b_{SM}=2.55$ μm, $b_{LM}=1.28$ μm. With a wavelength λ=860 nm and n=1.5, the result for the bar height $h_{SM}$ in accordance with the above equations moreover is $h_{SM}=0.57$ μm.

By means of the widths of the bars $S_M$ and gaps $L_M$ of the transparent phase structure, or respectively measuring graduation structure 9, as well as the bar height $h_{SM}$, or respectively phase depth, selected in this way, and in connection with the selected interferential signal generation, a phase shift of 120° of the signals detected by means of the three detector elements results in the end.

Figure 4A:
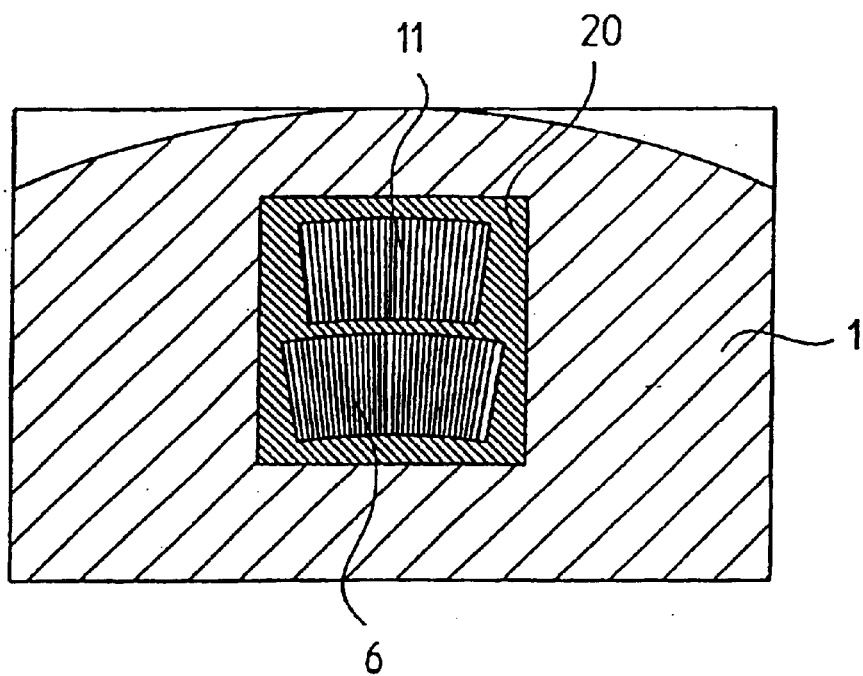
FIG. 4a is a view from above on the scanning graduation structure from the exemplary embodiment in FIG. 1.
Figure 4B:
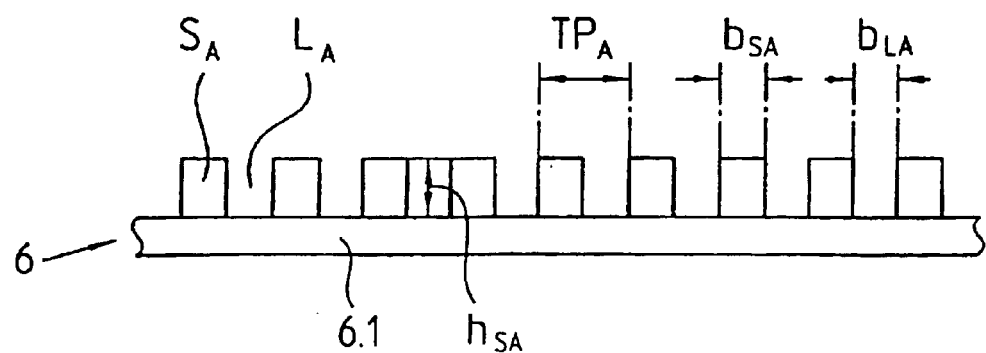

The embodiment of the scanning graduation structure 6 of the exemplary embodiment of FIG. 1 will be explained in greater detail by means of FIGS. 4a and 4b. In this case FIG. 4a shows a view from above on the scanning graduation structure 6 which is arranged directly on the housing 1, or respectively the flange 30, and in this exemplary embodiment only extends over a limited section of a circle. As already mentioned above, the scanning graduation structure 6 is designed as a reflection phase grating, which is represented in cross section in FIG. 4b. The scanning graduation structure 6 has of a periodic arrangement of reflecting bars $S_A$, which are applied to the also reflecting surface of a support body 6.1. These can be, for instance, bars $S_A$, made of chromium, on a steel support body 6.1. To increase the reflection, the surface the top of the scanning graduation structure 6 moreover can be coated with aluminum, aluminum oxide or with gold.

The width $b_{SA}$ of the bars $S_A$ here is selected to be identical to the width $b_{LA}$ of the gaps $L_A$ located between them, i.e. the width of the bars and gaps respectively corresponds to half the graduation period $TP_A$. The height $h_{SA}$, or respectively the phase depth of the bars $S_A$ of the scanning graduation structure 6 is preferably selected in accordance with $h_{SA} \approx \lambda/4$, which corresponds to a phase depth of 180°. λ again indicates the wavelength of the radiation used; thus, in the described exemplary embodiment a bar height $h_{SA}$=215 nm results for λ=860 nm. In the case of the above-mentioned 32768 graduation periods of the measuring graduation structure, $b_{SA}=b_{LA}$=1.915 μm is moreover provided.

A second scanning structure 11, provided besides the scanning graduation structure 6, here is used for scanning the reference marker fields next to the track with the measuring graduation structure, and thereby for generating at least one reference pulse signal. Therefore the second scanning structure will be identified in what follows as reference pulse scanning structure 11.

To assure a good quality of the resulting scanning signals, it is furthermore advantageous if a defined screen structure is arranged in the scanning beam path. Otherwise the modulation degree of the scanning signals drops because of the appearance of interfering radiation. In turn, the offset of the individual scanning signals is hampered by this, since the interfering radiation is not constant over the entire displacement path, or respectively the measuring path. With the position measuring system in accordance with the invention, a screen structure is therefore preferably provided on the part of the scanning graduation structure 6, such as is also indicated in the exemplary embodiment of FIG. 4a. There the surface of the support body adjacent to the two scanning structures 6, 11 is respectively made to be strongly absorbent. This is done by applying a strongly absorbing layer 20 to the areas of the support body which are radially and tangentially adjacent to the two scanning structures 6, 11, so that these areas are used as the screen structure 20 in the end.

Alternatively to this it would also be possible to arrange a mechanical screen as a screen structure of suitable shape in the beam path between the scanning unit 7 and the graduated disk 5. It would further also be basically conceivable to arrange the screen structure on the part of the graduated disk which, however, requires a greater outlay since the screen structure would have to be provided in a larger area than in the case of its arrangement adjacent to the scanning graduating structure, which spatially takes up only a small area.

A number of known possibilities exist in regard to scanning the reference marker field, all of which can be used and to which no further reference will be made here. In an advantageous manner so-called chirped structures, for instance, can be used for generating the reference pulse signals.

As already indicated several times, the scanning graduation structure 6 is directly arranged flat on the housing 1 of the position measuring system in order to assure in this way an arrangement thereof which is as insensitive against oscillations as possible. In the exemplary embodiment represented, this takes place in that the support body 6.1 with the bars SA arranged thereon is glued flat on the housing 1.

Alternately to this it would also be conceivable to arrange the scanning graduation structure directly flat on the housing, which could possibly be done by means of a suitable structuring of the surface of the housing, for example in the form of a suitable etching process. Then the scanning graduation structure would be an integral part of the housing. This arrangement of the flat placement of the scanning graduation structure on the housing would have the advantage that in case of the housing becoming warm, the scanning graduation would also be expanded radially symmetrically and therefore the graduation period measured in angular units would remain independent of the temperature. Since the same also applies to the graduated disk, no temperature-dependent vernier and/or moiré bares occur, and the scanning signals always remain stable.

Incidentally, the same effect, or respectively advantage, is also achieved if the reflecting scanning graduation structure is applied to a thin support body having a low modulus of elasticity and a high elongation at rupture. In this case the support body, including the scanning graduation structure, is then fastened by a solid, flat adhesion on the housing, so that the scanning graduation structure necessarily undergoes the same thermal expansion behavior as the housing. Thus, the scanning graduation structure could for instance be embodied as a suitable stamping on a thin plastic or metal foil constituting the support body, which is glued to the housing prior to stamping.

Figure 7:
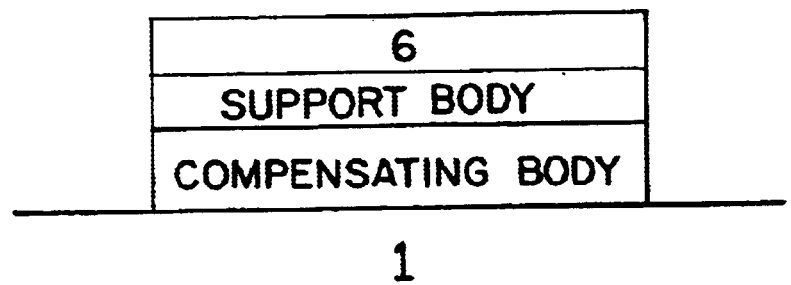
FIG. 7 schematically shows a side cross-sectional view of an embodiment of scanning graduation structure according to be used with the rotary position measuring system of FIG. 1.

Moreover, it would also be possible to arrange several separate scanning graduation structures distributed over the circumference of the housing. In this case it has also been shown to be advantageous if a compensating body is arranged between the housing and the actual scanning graduation structure. As shown in FIG. 7, the actual scanning graduation structure is then arranged by means of a support body on the compensating body, i.e. the support body is connected solidly and flat with the compensating body. On the other hand, the compensating body is connected with the housing such a way, for example by suitable gluing, that in case of thermal expansion it is assured that the compensating body is not twisted in relation to the housing. However, fastening of the compensating body is such that it can be radially displaced.

A suitably dimensioned disk made of glass or steel, for example, can be used as the compensating body. On it, the scanning graduation structure is in turn arranged on a glass support body.

In connection with a further advantageous embodiment it is possible to embody the scanning graduation structure in the form of a so-called sol-gel structure and to arrange it flat on the housing, or respectively the flange. Such production processes for fine structures are described, for example, in WO 93/06508, the entire contents of which are incorporated herein by reference.

Figure 5:
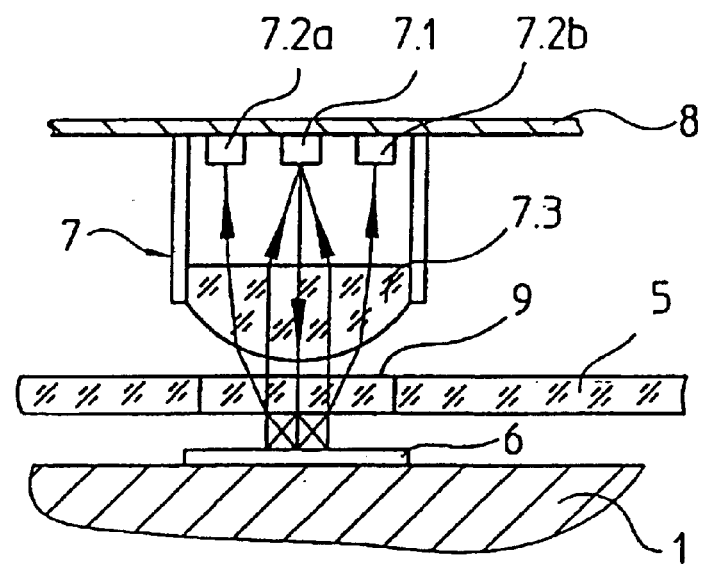
FIG. 5 is an enlarged view of the scanning unit in FIG. 1.

A portion of the position measuring system in accordance with the invention is represented in FIG. 5 enlarged in a lateral sectional view along the tangential direction. It is possible here to see in particular that in this exemplary embodiment the scanning unit 7 contains, besides a light source 7.1, which preferably is designed as an LED, several detector elements 7.2a to 7.2b. A further, third detector element 7.2c is hidden behind the light source 7.1 and is not visible in this view. Accordingly, by means of the three detector elements, which are preferably designed as photo-elements, the signals, which have been intensity-modulated as a function of displacement, are detected and, following the second passage through the measuring graduation structure 9, are deflected in the resultant zeroth, as well as +/−1 st orders of refraction, wherein the appropriate detector elements 7.2a, 7.2b, 7.2c are arranged in these spatial directions. Besides this, the scanning unit 7 comprises furthermore detector elements which are used for generating a reference pulse signal, but which cannot be seen in the representation in FIG. 5. The further elements of the scanning unit 7 have already been mentioned in the description of FIG. 1.

Figure 6:
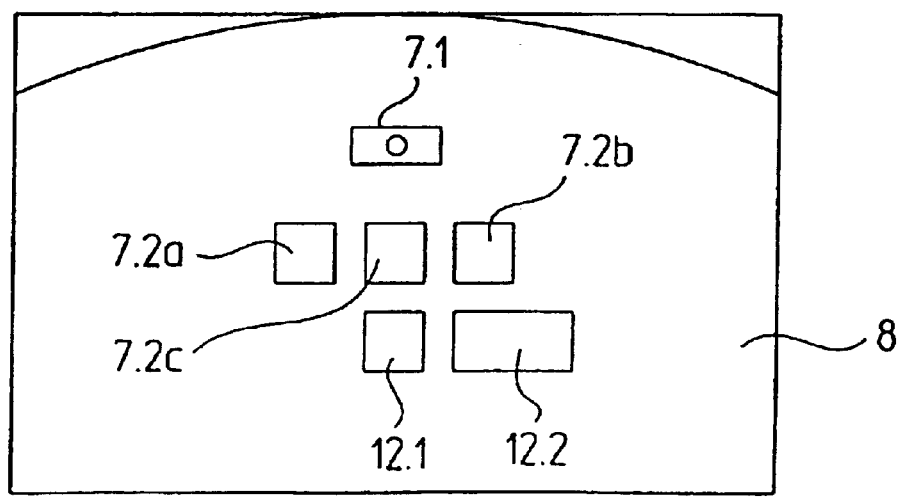
FIG. 6 is a plan view of the detector plane of the scanning unit from FIG. 5.

Finally, a plan view of the scanning unit 7 is represented in FIG. 6. For one, besides the light source 7.1, here the three previously mentioned detector elements 7.2a, 7.2b, 7.2c, which are arranged on the plate 8, can be seen, by means of which the interfering beams are detected, which are deflected by the measuring graduation structure into the zeroth, as well as the +/−1st orders of diffraction. Moreover, two further detector elements 12.1, 12.2 can be seen in this representation that are used for generating the reference pulse signal and are therefore assigned to the above mentioned reference pulse structures. While here a so-called phase reference pulse signal is generated in a known manner by a first detector element 12.1, the second detector element 12.2 is used for generating the counter-phase reference pulse signal. By means of the appropriate wiring of these two detector elements 12.1, 12.2, it is possible to generate a reference pulse signal that is largely unaffected by interference, at a defined absolute position.

In order to separate here the beams coming out of the track in the measuring graduation structure from those beams which stem from the reference marker field, it is necessary to assign suitable optical deflection elements between the optical device 7.3 that can be seen in FIGS. 1 and 5, and the scanning graduation structure 6. However, for reasons of improved clarity the representation of these deflection elements was omitted. These can be suitable prisms or multi-segment lenses with optical axes, which are displaced with respect to each other.

Besides the exemplary embodiment of the rotating position measuring system in accordance with the invention represented, alternative variations can of course also be realized within the scope of the teaching of the present invention.

For example, it is in no way absolutely necessary to arrange the scanning graduation structure only over one segment of a circle, instead, an arrangement thereof over the entire circular circumference can also be provided.

Besides this it would also be provided to arrange several scanning graduation structures with different graduation periods on the housing side in order to generate in this way, depending on the scanning graduation structure employed, different signal periods of the position-dependent signals. These could then possibly be arranged in different areas of the segments of the circle on the housing. It would be possible in this way to employ standardized housings for generating different graduation periods, which would result in a reduction of the production expenses.

It has furthermore been shown to be advantageous if, in accordance with the exemplary embodiment in FIG. 1, the direction of the lighting axis is selected radially inward, and not exactly parallel with the axis of rotation of the graduated disk, or toward the exterior. Small phase shifts result in this way between the interfering partial beams, so that the moiré and vernier effects, which reduce the signal modulations, can be kept negligibly small.

Moreover, it should finally be pointed out that it is of course also possible to embody alternative rotary configurations of a position measuring system, besides the described exemplary embodiment, in accordance with the invention.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A rotary position measuring system in accordance with the interferential operating principle, comprising:
   a housing;
   a scanning unit connected with the housing and comprising a light source that emits beams of light and a detector element;
   a reflection scanning graduation structure arranged directly on the housing opposite the scanning unit;
   a graduated disk that is connected with a rotatable shaft and comprising a radial transmission measuring graduation structure, wherein the graduated disk is arranged so it is rotatable around an axis of symmetry in the housing so that the measuring graduation structure is located between the scanning unit and the scanning graduation structure; and
   wherein the beams of light emitted by the light source first reach the measuring graduation structure where they are transmitted via a graduation of the measuring graduation structure a first time and split into a first set of diffracted partial beams of different orders, the diffracted partial beams impinge on the scanning graduation structure, where under reflection a second set of diffracted partial beams of different orders results and a back-reflection of the second set of diffracted partial beams in the direction toward the measuring graduation structure results, so that in effect the beams of light emitted by the light source are transmitted a second time through the same graduation of the measuring graduation structure, subsequent to the first time, wherein the beams of light transmitted the second time are directed along a direction that is opposite to a direction of transmission of the beams of light transmitted the first time and where the second set of diffracted partial beams interfere with one another and the detection of interfering partial beams takes place by the detector element.

2. The rotary position measuring system in accordance with claim 1, wherein said scanning graduation structure is arranged on a part of the housing which is insensitive against oscillations.

3. The rotary position measuring system in accordance with claim 2, wherein the scanning graduation structure is fastened flat on the housing.

4. The rotary position measuring system in accordance with claim 1, wherein the scanning graduation structure is fastened flat on the housing.

5. The rotary position measuring system in accordance with claim 4, wherein the scanning graduation structure is fastened by gluing on the housing.

6. The rotary position measuring system in accordance with claim 1, wherein the scanning graduation structure is only arranged in one segment of a circle.

7. The rotary position measuring system in accordance with claim 1, wherein the scanning graduation structure is arranged in a circular ring on the housing.

8. The rotary position measuring system in accordance with claim 1, wherein the scanning graduation structure is an integral part of the housing.

9. The rotary position measuring system in accordance with claim 8, wherein the scanning graduation structure is formed as an etched structure on the housing.

10. The rotary position measuring system in accordance with claim 1, wherein the scanning graduation structure is formed as a stamping on a thin foil, and the foil is arranged flat on the housing.

11. The rotary position measuring system in accordance with claim 1, wherein a screen structure in the form of an absorbent layer is arranged adjacent to the scanning graduation structure.

12. The rotary position measuring system in accordance with claim 1, wherein the housing is designed in a cylinder shape and comprises a flange on which the scanning graduation structure is arranged.

13. The rotary position measuring system in accordance with claim 1, wherein the scanning graduation structure is arranged on a compensating body on the housing, and the compensating body is connected in a manner fixed against relative twisting and radially displaceable with the housing.

14. The rotary position measuring system in accordance with claim 1, wherein the measuring graduation structure is radially symmetrically arranged around the axis of symmetry.

15. The rotary position measuring system in accordance with claim 1, wherein tilting or tumbling of said scanning graduation structure with respect to said measuring graduation structure does not affect a position of position-dependent signals received by said detector element.

16. The rotary position measuring system in accordance with claim 1, wherein a neutral point lies in a plane defined by said graduated disk, wherein said neutral point is defined to be a point around which either said measuring graduation structure or said scanning unit inclusive of said reflection scanning graduation structure can be pivoted within a defined tolerance range without affecting a position of position-dependent signals received by said detector element.

17. A rotary position measuring system in accordance with the interferential operating principle, comprising:

a housing;

a scanning unit connected with the housing and comprising a light source that emits beams of light and a detector element;

a reflection scanning graduation structure arranged directly on the housing opposite the scanning unit;

a graduated disk that is connected with a rotatable shaft and comprising a radial transmission measuring graduation structure, wherein the graduated disk is arranged so it is rotatable around an axis of symmetry in the housing so that the measuring graduation structure is located between the scanning unit and the scanning graduation structure, and wherein the measuring graduation structure comprises a phase grating with alternatingly arranged bars and gaps, and wherein either $b_{SM}=\frac{1}{3} TP_M$ or $b_{SM}=\frac{2}{3} TP_M$ applies for the bar width $b_{SM}$, wherein $TP_M$ identifies the graduation period of the phase grating; and wherein the beams of light emitted by the light source first reach the measuring graduation structure where they are transmitted a first time via a graduation of the measuring graduation structure and split into a first set of diffracted partial beams of different orders, the diffracted partial beams impinge on the scanning graduation structure, where under reflection a second set of diffracted partial beams of different orders results and a back-reflection of the second set of diffracted partial beams in the direction toward the measuring graduation structure results, so that in effect the beams of light emitted by the light source are transmitted a second time through the same graduation of the measuring graduation structure, subsequent to the first time, wherein the beams of light transmitted the second time are directed along a direction that is opposite to a direction of transmission of the beams of light transmitted the first time and where the second set of diffracted partial beams interfere with one another and the detection of interfering partial beams takes place by the detector element.

18. The rotary position measuring system in accordance with claim 17, wherein the bar height of the measuring graduation structure, $h_{SM}$, is defined by the equation $h_{SM}(n-1)=\lambda/3$, wherein n identifies the refractive index of the bar material, while $\lambda$ identifies the wavelength of the light source used.

19. The rotary position measuring system in accordance with claim 18, wherein the scanning graduation structure comprises a phase grating with alternatingly arranged bars and gaps, and the bar width $b_{SA}$ equals the gap width $b_{LA}$.

20. The rotary position measuring system in accordance with claim 19, wherein the bar height of the scanning graduation structure, $h_{SA}$, is defined by the equation $h_{SA}=\lambda/4$, wherein $\lambda$ identifies the wavelength of the light source used.

21. The rotary position measuring system in accordance with claim 17, wherein tilting or tumbling of said scanning graduation structure with respect to said measuring graduation structure does not affect a position of position-dependent signals received by said detector element.

22. The rotary position measuring system in accordance with claim 17, wherein a neutral point lies in a plane defined by said graduated disk, wherein said neutral point is defined to be a point around which either said measuring graduation structure or said scanning unit inclusive of said reflection scanning graduation structure can be pivoted within a defined tolerance range without affecting a position of position-dependent signals received by said detector element.

23. A rotary position measuring system in accordance with the interferential operating principle, comprising:

a housing;

a scanning unit connected with the housing and comprising a light source that emits beams of light and a detector element, wherein the scanning unit is arranged on a circular plate which is connected via lateral housing walls with the housing;

a reflection scanning graduation structure arranged directly on the housing opposite the scanning unit;

a graduated disk that is connected with a rotatable shaft and comprising a radial transmission measuring graduation structure, wherein the graduated disk is arranged so it is rotatable around an axis of symmetry in the housing so that the measuring graduation structure is located between the scanning unit and the scanning graduation structure; and wherein the beams of light emitted by the light source first reach the measuring graduation structure where they are transmitted a first time via a graduation of the measuring graduation structure and split into a first set of diffracted partial beams of different orders, the diffracted partial beams impinge on the scanning graduation structure, where under reflection a second set of diffracted partial beams of different orders results and a back-reflection of the second set of diffracted partial beams in the direction toward the measuring graduation structure results, so that in effect the beams of light emitted by the light source are transmitted a second time through the same graduation of the measuring graduation structure, subsequent to the first time, wherein the beams of light transmitted the second time are directed along a direction that is opposite to a direction of transmission of said beams of light transmitted said first time and where the second set of diffracted partial beams interfere with one another and the detection of interfering partial beams takes place by the detector element.

24. The rotary position measuring system in accordance with claim 23, wherein tilting or tumbling of said scanning graduation structure with respect to said measuring graduation structure does not affect a position of position-dependent signals received by said detector element.

25. The rotary position measuring system in accordance with claim 23, wherein a neutral point lies in a plane defined by said graduated disk, wherein said neutral point is defined to be a point around which either said measuring graduation structure or said scanning unit inclusive of said reflection scanning graduation structure can be pivoted within a defined tolerance range without affecting a position of position-dependent signals received by said detector element.

* * * * *